Feb. 24, 1931. G. E. KRIDER 1,793,741
SELF OILING BEARING
Filed Jan. 14, 1930
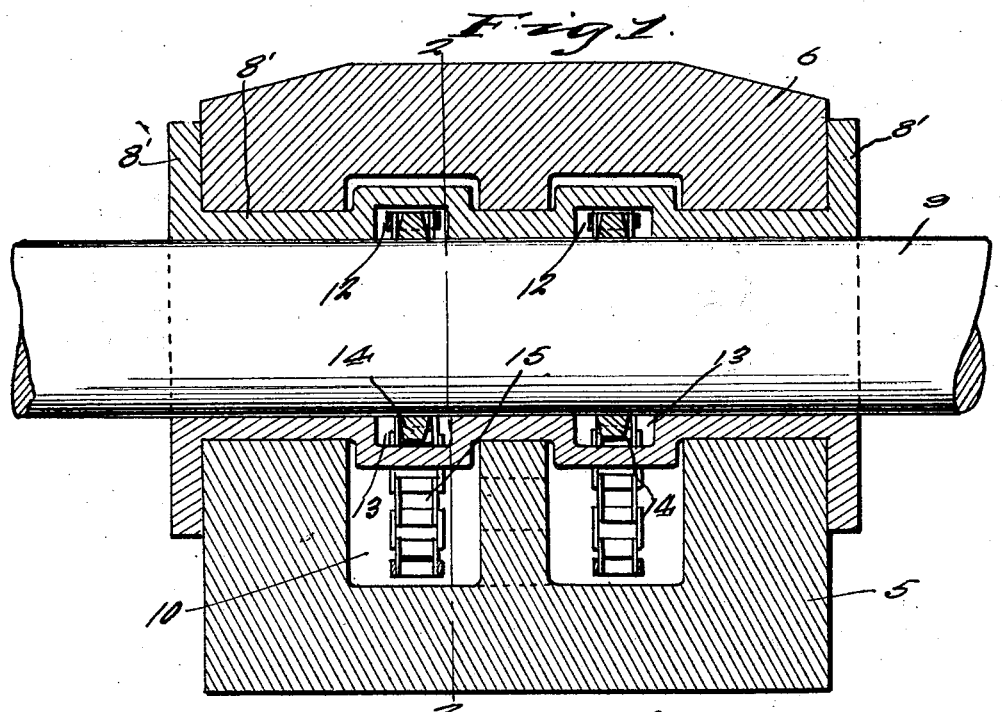
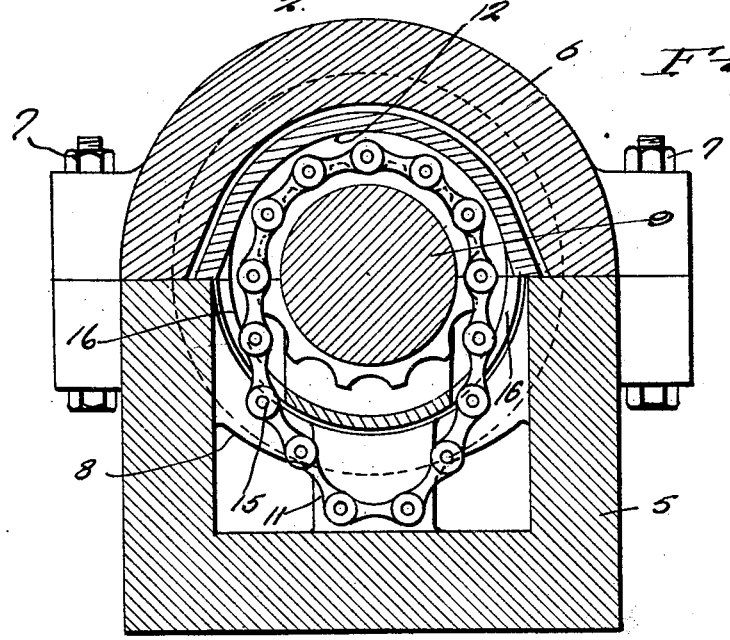
Inventor
George E. Krider
By Clarence A. O'Brien
Attorney Patented Feb. 24, 1931

1,793,741

UNITED STATES PATENT OFFICE

GEORGE EDWARD KRIDER, OF DUNCANSVILLE, PENNSYLVANIA, ASSIGNOR TO McLANAHAN-STONE MACHINE COMPANY, OF HOLLIDAYSBURG, PENNSYLVANIA, A CORPORATION OF PENNSYLVANIA

SELF-OILING BEARING

Application filed January 14, 1930. Serial No. 420,729.

This invention relates broadly to bearings, and has more particular reference to a self oiling bearing.

A primary object of this invention is to provide a self oiling bearing embodying the usual bearing housing, a bushing arranged in the housing within which is rotatable a shaft, which shaft may be an axle shaft or any other shaft, in conjunction with chain and sprocket means for drawing oil from the oil well in the base of the bearing housing upwardly and into the bushing for continuously maintaining the rotating shaft in a well oiled condition.

A still further object of the invention is to provide a bearing of the above mentioned character which will be simple in construction, thoroughly reliable, practical and efficient in operation and which will insure at all times proper lubrication for the shaft and journal therein.

Other objects and advantages of the invention will become apparent from a study of the following specification, taken in connection with the accompanying drawings, wherein:—

Figure 1 is a longitudinal sectional view taken through the bearing embodying the features of the present invention.

Figure 2 is a detail sectional view taken substantially on line 2—2 of Figure 1.

With reference more in detail to the drawing, it will be seen that the bearing comprises the usual outer housing embodying two sections including the base section 5 and the cap section 6 maintained in clamped relation by suitable clamping bolts 7'. Mounted within the housing is the bearing sleeve or bushing 7, which bushing 7 at its opposite ends may be provided with retaining flanges 8 abutting the adjacent ends of the bearing housing for retaining the bushing 7 against longitudinal deflection. Rotatably mounted within the bearing bushing 7 is a shaft 9 which shaft 9 may be an axle shaft, motor driven shaft or any other type of rotative shaft.

As comprehended by the present invention, the base 5 of the bearing is provided with an oil well 10 extending transversely thereof. Rising from about the center of the bottom of the oil well is a partition member 11 for supporting the lower intermediate end of the bearing bushing 7 as clearly suggested in Figure 1. The cap 6 of the bearing on opposite sides of the partition 11 is provided with a pair of spaced transversely extending grooves or recesses 12. The recesses 12 are disposed directly above the oil well 10 at opposite sides of the partition 11.

The bearing bushing 7 is provided with a pair of circular sprocket housings 13, the upper portions of the housings 13 extending in the recesses 12 of the cap 6 and the lower portions of said annular housings 13 extending into the oil well 10 on opposite sides of the partition 11. Splined to the shaft 9 in any suitable manner and rotatable within the sprocket housings 13 are the sprockets 14. Trained over each of the sprockets 14 is an endless sprocket chain 15 which chain 15 has the lower depending ends extending into the oil well 10 through slots 16 formed in opposite sides of the sprocket housings 13 adjacent the lower or bottom of the sprocket housings as clearly suggested in Figure 2.

Obviously, during rotation of the shaft 9, the endless sprocket chain 15 will be rotated thus acting as a conveyor for drawing the oil out from the well 10 into the sprocket housings 13 and on to the shaft 9 for maintaining the shaft 9 continuously in a well lubricated condition.

It is thought that from the foregoing description, taken in connection with the accompanying drawings, a clear understanding of the operation, construction, utility and advantages of a device of this character will be had by those skilled in the art without a more detailed description.

Even though I have herein shown and described the preferred embodiment of my invention it is to be understood that the same is susceptible to changes fully comprehended by the spirit of the invention as herein described, and the scope of the appended claims.

Having thus described my invention, what I wish to claim as new is:—

1. In a self oil bearing comprising a seat having an oil well in the bottom thereof, a cap for said seat, a bearing bushing, a shaft journaled in said bearing bushing, said bearing bushing being provided with an annular sprocket housing, a sprocket on said shaft movable in the housing, an endless sprocket chain trained over said sprocket and having its lower end portions extending through slots formed in the bottom of said housing for conveying oil from said well to the periphery of said shaft, said slots having their upper edges bent outwardly for engaging the upper edges of the seat to prevent rotation of the bushing.

2. A device of the class described comprising a sectional housing composed of upper and lower sections, said lower section having an oil well therein, and with its upper edges provided with shoulders, a shaft in the housing having an oil dipper movable thereabout, a bearing bushing between the housing and the shaft having an annular recess to accommodate the dipper and provided with openings in its opposite sides through which the dipper passes and outwardly projecting lips at the upper ends of the openings resting on said shoulders for retaining the bearing against rotation.

In testimony whereof I affix my signature.

GEORGE EDWARD KRIDER.